G. F. WELCH.
SELF MEASURING OIL PUMP.
APPLICATION FILED APR. 27, 1908.
906,478.
Patented Dec. 8, 1908.
2 SHEETS—SHEET 2.
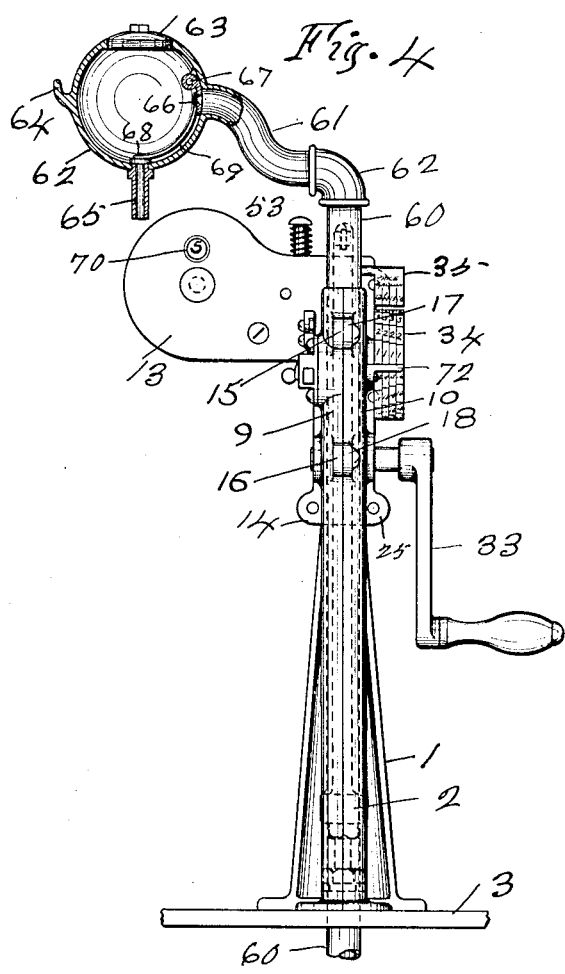
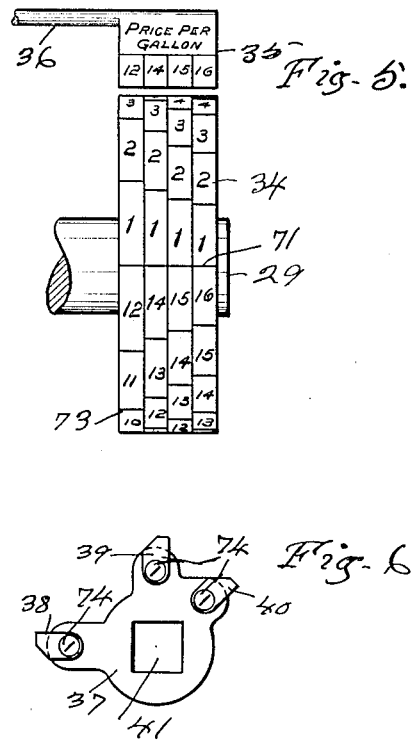
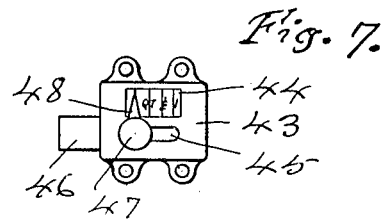
WITNESSES:
J. R. Dickens
Augusta Viberg
George F. Welch INVENTOR.
BY Chapin & Denny
ATTORNEYS.

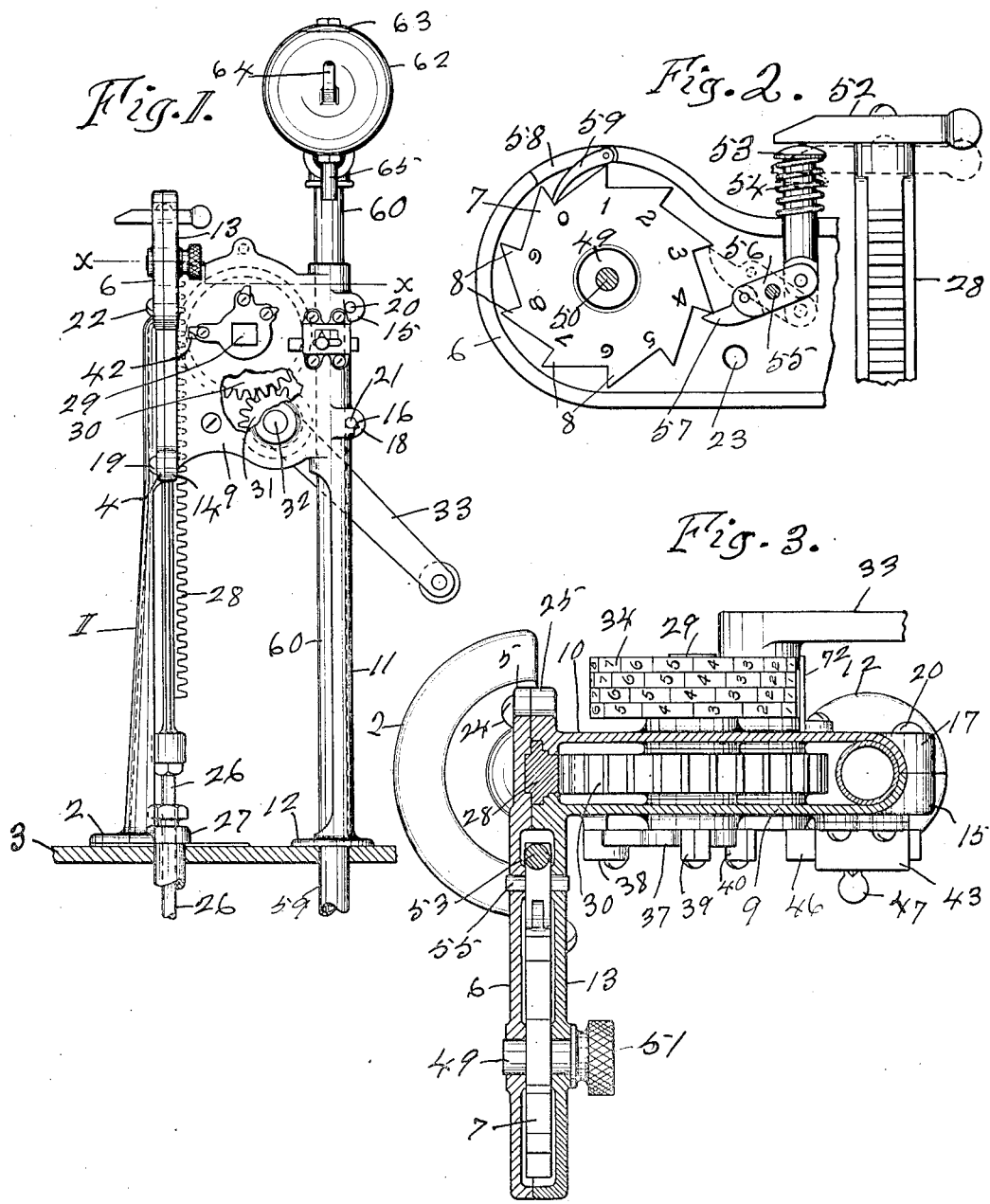

UNITED STATES PATENT OFFICE.

GEORGE F. WELCH, OF FORT WAYNE, INDIANA, ASSIGNOR OF ONE-HALF TO FRANK D. WALTER, OF FORT WAYNE, INDIANA.

SELF-MEASURING OIL-PUMP.

No. 906,478.      Specification of Letters Patent.      Patented Dec. 8, 1908.

Application filed April 27, 1908. Serial No. 429,295.

*To all whom it may concern:*

Be it known that I, GEORGE F. WELCH, a citizen of the United States, residing at Fort Wayne, in the county of Allen, in the State of Indiana, have invented certain new and useful Improvements in Self - Measuring Oil-Pumps; and I do hereby declare that the following is a full, clear, and exact description of the invention, which will enable others skilled in the art to which it appertains to make and use the same, reference being had to the accompanying drawings, which form part of this specification.

My invention relates to improvements in self-measuring oil-pumps, designed for use in connection with retailer's oil tanks.

The object of my present invention is to provide a cheap, efficient, convenient and reliable self-measuring pump specially designed and adapted for the retailing of illuminating oils, and so constructed as to automatically deliver to the purchaser any desired quantity of the liquid, to be measured either in gallons or fractions thereof, or by the standard of a monetary value, and to indicate to both retailer and purchaser at each operation of the pump, the exact amount of oil delivered, by means of a novel form of self-measuring and indicating mechanism.

My invention consists of an upright supporting-standard carrying the various operating mechanisms; a vertically reciprocating rack-bar slidable in a suitable guide in the standard, and connected at its lower end to the pump-rod; an actuating gear for operating the rack-bar; means for limiting the movement of the rack-bar to secure any predetermined quantity of oil; means for indicating the amount of oil delivered at each operation of the rack-bar; means for indicating the limit of movement of the rack-bar to discharge a predetermined monetary value of oil when desired; a discharge pipe arranged in the supporting standard in parallel relation with the rack-bar; and means for automatically preventing the drip from the nozzle of the discharge-pipe.

The principal novel features of my invention reside in the pump-rod actuating means;
the self-measuring mechanism; the indicating mechanisms; and the discharge means in which drip is avoided.

Similar reference numerals indicate corresponding parts throughout the several views of the drawings in which—

Figure 1 is a front elevation of my invention showing the form of the supporting standard and the inclosing casing, partly broken away to show the inclosed actuating gears, and also showing the relative arrangement of the self measuring regulating means. Fig. 2 is a detail side elevation of the gallon indicating mechanism in its coöperative relation with the means for actuating the same, partly broken away, one-half of the two-part casing for the gallon indicating mechanism being removed. Fig. 3 is a cross-section of the pump taken on the line $x$—$x$ of Fig. 1, to show the relative arrangement of the various operative mechanisms within and without the casing. Fig. 4 is a side elevation of the pump looking from the right in Fig. 1, showing the arrangement of the monetary dial, and showing the discharge nozzle in vertical central section to show the drip preventing means. Fig. 5 is an enlarged detail of the monetary dial with its supporting shaft partly broken away. Fig. 6 is an enlarged detail front view of one-part of the self-measuring regulating means, and Fig. 7 is a detail front view of the other coöperating part of the said means.

The supporting standard 1 on which the pump mechanism is mounted has a semicircular base 2 adapted to rest upon the top 3 of any proper oil tank not shown, but of well understood construction, and a pair of laterally apertured opposite lateral lugs 4 and 5 and is provided at its upper end with a lateral extension 6 comprising one section of the two-part sheath or casing which incloses the gallon indicating dial consisting of a disk 7 having a series of measured peripheral teeth 8, at the base of which the numerals from 0 to 9 are arranged, as shown in Fig. 2. The sheath or casing for the actuating gear is also in two parts 9 and 10 of similar construction, and each has an integral pendent extension 11 adapted to form when united a two part supporting standard having a circular base 12. The casing section 9 has a lateral extension 13 preferably integral and the counterpart of the extension 6 and for identically the same function, and is provided with the laterally apertured ears 14, 15 and 16 adapted to be rigidly secured to the corresponding apertured ear 4 of the standard 1 and to the ears 17 and 18 respectively of the casing section 10 by means of proper screws 19, 20 and 21. The parts 6 and 13 of the dial casing are further rigidly secured together by means of the screw 22, the opening in part 6 being shown at 23 in Fig. 2, and by means of the screw 24 in the lugs 5 and 25, the latter being on the casing section 10, Fig. 3. A proper pump-rod 26 passes through a proper stuffing-box 27 fixed in a suitable opening in the top 3 of the tank, Fig. 1, and to its upper end is detachably connected a rack-bar 28, whose upper end is slidably mounted in a suitable guiding opening in the gear sheath, as shown in Fig. 3.

In a transverse opening having suitable bearings as shown in Fig. 3, is rotatively mounted an arbor 29 on which is fixed the gear-wheel 30 adapted for a meshing engagement with the pinion 31 fixed on the shaft 32 on one extended end of which is fixed the operating crank-handle 33.

On one extended end of the arbor 29 is fixed a disk 34 having upon its perimeter a graduated scale showing the monetary value of any given quantity of oil at different prices per gallon, hereafter explained. Directly above this disk is arranged a plate 35 containing the usual retail prices of oil. This plate preferably has a pin like extension 36 which is fixed in a suitable lateral opening in the side of the gear casing near the top thereof. The other extended end of the arbor 29 is preferably angular, as seen in Fig. 1, and has a disk 37 fixed thereon. This disk is preferably of somewhat irregular contour, and is provided at or near its perimeter with a plurality, preferably three, radially arranged and slightly extended adjustable fingers 38, 39 and 40 respectively, Figs. 1, and 6. This disk has a central angular opening 41, and one corner of the free end of these fingers is beveled, as shown, to enable them to more surely pass the regulating stop, about to be described on the return movement of the disk in use. In the adjacent face of the casing section 9 in coöperative relation with the finger 38 is a fixed pin 42, Fig. 1, adapted to limit the forward movement of the disk 37 and the arbor 29 by the engagement of the finger 38 therewith, in the manner hereafter described. On the same side of the casing section 9 in coöperative relation with the disk 37 is detachably mounted a small casing 43 having a gradual scale 44 thereon indicating a pint, a quart, a one-half gallon, and one gallon, and provided with a longitudinal notch 45. In this casing 43 is slidably mounted a horizontal bar 46 in which is fixed a pin 47 slidable in the slot 45, and having an index finger 48 in coöperative relation with the scale 44 in the manner and for the purpose about to be described.

The toothed disk 7 is fixed upon the short shaft 49 Fig. 3, whose ends are loosely mounted in suitable lateral openings in the casing sections 6 and 13 respectively. One end of this shaft 49 has a screw 50 fixed therein provided with a milled head 51 to enable the operator to return the disk to normal position when desired.

On the upper end of the vertical rack-bar is pivotally mounted, approximately midway of its ends, a short arm 52, adapted for an actuating engagement with the upper free end of the pin 53 which is loosely mounted in a suitable vertical opening in the top of the dial casing, and in coöperative relation with the adjacent end of the arm 52, Fig. 2. This pin 53 has upon its upper end a coil spring 54 one end of which bears against the head of the pin and the other end against the adjacent dial casing.

On a transverse pin 55 fixed in the sides of the dial casing is pivotally fulcrumed a lever 56 having its ends bifurcated and pivotally connected at one end to the lower end of the pin 53, and having its other end provided with a pivoted pawl 57 adapted for an actuating engagement with the teeth 8 of the dial 7. In a slot 58 in the upper edge of the dial casing is mounted a pivoted gravity pawl 59 adapted to engage the teeth 8 to prevent any retrograde movement thereof. The vertical discharge-pipe 60 leading from the oil tank is firmly secured in position by passing through a central opening in the two-part base 12 of the standard extensions 11, and through the gear casing, Figs. 1 and 3. The upper end of the discharge pipe has a forward extension 61 connected thereto by an elbow 62 or other proper manner. This extension 61 has a fixed or integral globular extension 62 having a screw-threaded lid 63, a hook 64 from which to suspend an oil can, and a pendent discharge tube or spout 65. The function of the receptacle 62 is to avoid the usual drip from the discharge spout. This is accomplished by hinging on the pivot 67 a valve 66 adapted by gravity to close the opening from the extension 61, and having a valve 68, adapted to close the opening to the discharge-pipe 65, and connected to the valve 66 by means of the curved plates 69, whereby both valves will automatically resume their respective seats by gravity.

The operation and manner of employing my invention thus described is obvious and briefly stated is as follows: When it is desired to draw and deliver to a customer a gallon of oil from the tank, the operator suspends the customer's oil can from the hook 64 with the spout 65 in position to discharge into the same. He then adjusts the index finger 48 to the right until it indicates the gallon mark, Fig. 7, thereby withdrawing the inner extended end of the stop bar 46 within the casing 43. He now gives the operating crank-handle 33 a full rotation to the right in Fig. 1, until it is stopped by the contact of the finger 38 with the other side of the pin 42. This operation delivers a full gallon, it being, of course assumed that all parts of the pump are previously properly adjusted.

When the discharging liquid is forced through the tubular extension 61 it will force open the hinged valves 66 and 68, and hold them open until the flow through the same ceases, after which both of said valves will assume their seats by gravity and prevent any drip through the discharge spout 65. Should a one-half gallon of oil be desired the operator sets the finger 48 at the one-half gallon mark on the casing 43 which will set the stop-bar 46 at a sufficient projection to permit the fingers 39 and 40 to pass, but to project into the path and holdingly engage the finger 38 upon the forward rotation of the crank-arm thereby limiting the crank-arm to a one-half turn. To deliver one quart of oil the operator sets the finger 48 at the quart mark on the scale 44, which thereby extends the stop 46 into the path of the finger 39, and then operates the crank handle as before, which will then be given but a one-fourth turn and thus deliver one fourth of a gallon. In like manner to deliver a pint of oil the finger 48 is set at the line of the pint mark which will project the inner end of the stop 46 into the circular path of the finger 40, and thereby permit the operation of the crank handle only to a one eighth of a rotation thereof and will thus deliver only a one eighth of a gallon.

When the operator desires to deliver to one receptacle several gallons he can have the pump keep a register of such number to avoid any oversight or miscount on his part, as follows: He adjusts the pivoted arm 52 in vertical alinement with the pin 53, Fig. 2, whereby at each down stroke of the rack-bar 28 the pawl 57 will rotate the dial plate 7 the distance between the teeth thereof, whereby starting at 0 on the dial the delivery of five gallons, for example, would require five down strokes of the rack bar 28, and consequently five movements of the disk 7 by the pawl 57, which would bring the numeral 5 on the disk directly opposite the lateral opening 70 in the casing section 13, Fig. 4, in full view of both the operator and the customer. He then returns the dial disk 7 to its normal position with 0 opposite the opening 70, by seizing the nut 51 and rotating the disk to the left in Fig. 2, which can readily be done since the pawl 57 is pivotally mounted in the lever 56 and yields freely against the contact of the teeth 8 with its lower face.

Obviously at each operation of the dial disk the gravity pawl 59 prevents any retrograde movement thereof, and that the number of gallons thus discharged to any single customer will be accurately registered and exposed to view at the opening 70.

When a customer desires to purchase a certain number of cents' worth of oil it is measured to him as follows: The disk 34 is so arranged on the arbor 29 that the line 71, Fig. 5, will be in exact horizontal alinement with the adjacent upper face of the finger 72, Figs. 3 and 4, when the rack bar is at the lowest limit of its movement, and the pump mechanism is in the position shown in Fig. 1. This disk has its perimeter divided laterally into a plurality of spaces, for example four spaces arranged in alinement with the same number of corresponding spaces on the fixed plate 35 which spaces contain each a different price of oil, as shown in Fig. 5. The peripheral disk spaces are divided circumferentially into spaces indicating cents up to the price of a gallon. Assuming, for illustration that a customer calls for ten cents' worth of oil when oil is worth twelve cents a gallon, the retailer measures that amount of oil to him by rotating the handle 33 in the usual manner until the line 73, Fig. 5, is brought around to horizontal alinement with the finger 72, Fig. 4. In like manner any number of cents' worth of oil can be thus accurately measured and delivered at pleasure. When oil is thus measured the stop-bar 46 is, of course, withdrawn within the casing 43 and out of the path of the fingers 38, 39 and 40. These last mentioned fingers can readily be adjusted on their supporting screws 74 to secure absolute accuracy of measurement.

Having thus described my invention and the manner of employing the same, what I desire to secure by Letters Patent is:

1. A self-measuring oil pump consisting of an upright supporting standard; a rack-bar slidably mounted in the standard and connected at its lower end to the pump-rod; a two-part sheath mounted on the standard; a revoluble arbor transversely mounted in the sheath; a gear-wheel mounted in the sheath in mesh with the upper end of the rack-bar, and fixed upon a rotatable arbor; a plate fixed on one extended end of the arbor, and provided with spaced peripheral adjustable fingers; an adjustable bar mounted on the outer face of the sheath adapted to be projected into the path of the said fingers, one at a time, to limit the rotation of the arbor; a pinion rotatively mounted in the casing in mesh with the said gear-wheel; and means for actuating the said pinion.

2. In a self measuring oil pump an upright standard; a vertically reciprocating rack slidable in the upper end of the standard; a detachable sheath mounted on the standard; means for actuating the rack arranged within the sheath, consisting of a revoluble arbor, a gear fixed on the arbor in mesh with the rack, and a pinion having an operating crank handle and in mesh with the gear; a disk fixed upon one extended end of the arbor and provided upon its periphery with a dial face indicating the monetary value of any quantity of liquid delivered; means for limiting the rotary movement of the gear consisting of a disk fixed upon the other extended end of the arbor, a plurality of fingers arranged at and projecting from the perimeter of the disk, and adjustable means for engaging said fingers as described.

3. In a liquid pump self-measuring and indicating means comprising a sectional sheath vertically supported; a vertically movable rack passing through the sheath; a serrated disk revolubly mounted in the casing and having gallon marks upon one side thereof; means for actuating the disk at each full down stroke of the rack consisting of a lever-arm pivotally fulcrumed midway of its ends, and carrying upon one end a pivoted pawl adapted to engage the serrations of the disk one at a time, an upright spring-pressed pin pivotally connected at its lower end to the other end of the lever-arm, and an arm pivotally mounted on the upper end of the rack-bar, and adapted for an actuating engagement with the said pin; means for actuating the rack; means for measuring the discharge at each operation by limiting the vertical movement of the rack; and means for automatically measuring the monetary value of the liquid at each discharge of the pump.

4. In an oil pump means for measuring liquid at each discharge of the pump, consisting of a vertically movable rack; a rotatable arbor; a gear wheel fixed on the arbor in gear with the rack; means for actuating the gear; a horizontally adjustable bar whose adjustment is regulated by a graduated scale; a disk fixed upon one end of the arbor in coöperative relation with the said bar; and a plurality of stop-fingers arranged upon the disk at different distances from the axis of the arbor, and adapted to engage the bar one at a time, at different adjustments of such bar.

5. In an oil pump means for measuring and delivering oil upon a monetary standard consisting of a vertically movable rack; a sectional casing inclosing the upper portion of the rack and provided with opposite lateral openings; an arbor revolubly mounted in the said lateral openings; a gear-wheel fixed on the arbor in mesh with the rack; means for actuating the gear; a disk fixed on one extended end of the arbor, and provided upon its perimeter with a graduated scale; and a fixed finger in coöperative relation with the said scale, all substantially as described.

Signed by me at Fort Wayne, Allen county, State of Indiana, this 25th day of April, A. D. 1908.

GEORGE F. WELCH.

Witnesses:
AUGUSTA VIBERG,
WATTS P. DENNY.